Jan. 16, 1951　　　　　J. L. R. FATON　　　　　2,538,089
CLOSURE OF AUTOCLAVES AND THE LIKE
Filed Nov. 1, 1946　　　　　　　　　　　　　2 Sheets-Sheet 1

INVENTOR.
JOSEPH LOUIS RENE FATON
BY
Dale A. Bauer
ATTORNEY

Jan. 16, 1951   J. L. R. FATON   2,538,089
CLOSURE OF AUTOCLAVES AND THE LIKE
Filed Nov. 1, 1946   2 Sheets-Sheet 2

INVENTOR.
JOSEPH LOUIS RENE FATON
BY
Dale A. Bauer
ATTORNEY

Patented Jan. 16, 1951

2,538,089

UNITED STATES PATENT OFFICE 2,538,089

CLOSURE OF AUTOCLAVES AND THE LIKE

Joseph Louis Rene Faton, Neuilly sur Seine, France, assignor to Societe Anonyme des Manufactures des Glaces et Produits Chimiques de Saint-Gobain, Chauny & Cirey, Paris, France Application November 1, 1946, Serial No. 707,133
In France December 10, 1945

9 Claims. (Cl. 23—290)

This invention relates to the closure of vessels, such as autoclaves, in which there exists a high pressure under working conditions.

The most common method of closing such vessels is that which consists in clamping together two flanges, carried respectively on the autoclave or the like and its cover, by means of nuts which are screwed on to bolts arranged in notches formed in the flanges and distributed evenly around the circumference of the autoclave or the like. This method requires a relatively long time for the complete closing of the autoclave. Actually, in order that the closure shall be perfectly pressure-tight, it is necessary, in particular, that the clamping action exerted on the sealing packing generally interposed between the vat and the cover be uniform over the entire periphery. To this end, it is therefore necessary that the nuts should be tightened one by one on their respective bolts, this tightening, moreover, being carried out in a certain order so as to insure a uniform distribution of the forces at any moment. Moreover, after a first tightening, it is necessary to carry out an inspection, nut by nut, in order to be absolutely certain that all have been fully tightened. When it is desired to open the autoclave again, it is equally essential to loosen each nut separately in a certain sequence and progressively in order that the autoclave may be opened without incident.

The time during which the autoclave is not available for carrying out a predetermined operation is consequently appreciably increased owing to the slowness with which the apparatus may be closed and opened. As a result, labor and material is not well utilized and consequently the cost price of the manufactured product is increased.

The present invention has for an object to overcome these disadvantages, while insuring an efficient closure of the vessels of the type referred to.

Another object of the invention is to devise a plant system for autoclaves providing for maximum ease in handling and for maximum security in operation.

Another object is to speed up the processing of materials by autoclaves.

Another object is to replace manually operated autoclave closures by power-operated closures of uniform operation in which power failure during operation need not release the pressure in the autoclave.

Another object is to transport and handle autoclave vats in an improved manner and to provide means therefor.

Another object of the invention is a power system for sealing autoclaves evenly, quickly, and securely.

According to this invention a method of rapidly closing autoclaves and like vessels is characterized in that the force necessary for first bringing the vat and cover together and then for uniformly compressing the pressure-tight joint-packing, is composed of a plurality of elementary stresses exerted at different points of the vat-cover assembly by means of the hydraulic or pneumatic action of a single source of fluid under pressure, under conditions such that an automatic balancing and equalization of these stresses is operative at any moment.

In practice, the elementary stresses will be exerted simultaneously by connecting the various devices which give rise to them to the single source of fluid under pressure.

Since it is necessary, when the autoclave is put under pressure, to insure positively that the clamping action is maintained, the invention also comprises additional devices for mechanically locking the vat and the cover in the relative positions taken up under the action of the fluid under pressure and for preventing their relative displacement in the event of the pressure of the fluid being reduced, either accidentally or by a deliberate action on the part of the operator.

For carrying the method into effect, the invention provides for the employment of hydraulic or pneumatic jacks operated by any suitable fluid under pressure, such as water, oil, compressed air, etc. These jacks, of which the elements are cylinder and piston, are respectively connected during the clamping operation to the vat and to the cover, or conversely, may be mounted one at each of the points where the elementary stresses are to be exerted. However, it may be advantageous in certain cases to employ a number of jacks smaller than the number of the said elementary stresses, combining with each of these jacks an articulated system capable of splitting the stress produced by the associated jack into several equal stresses distributed at suitable points.

Moreover, the additional means for positively insuring the maintenance of the compressive stresses on the pressure-tight joint may be constituted by a device of the screw and nut type. For example, an external screw thread may be formed on each jack cylinder so that a nut may be displaced along the same to immobilize the corresponding piston.

In bringing about these closures by the action of a fluid under pressure, the inventor has recognized that the upper face of the cover may be advantageously employed for the positioning of the jacks, and if necessary, the articulated systems which they control. In this case, it will be equally advantageous for the cover to be fixed in space and to have a movable vat, this mobility being utilized both for the movement thereof toward the cover and for the compression of the joint, and for manipulating the vat when filling and emptying it.

The accompanying drawings illustrate an example of an autoclave provided with a closure device according to the invention in which the jacks are combined with articulated means for transmitting the clamping stresses.

In the drawings, wherein like reference characters refer to like parts throughout the several views, Fig. 1 is an elevational view of the autoclave, with details in section;

Figure 1:
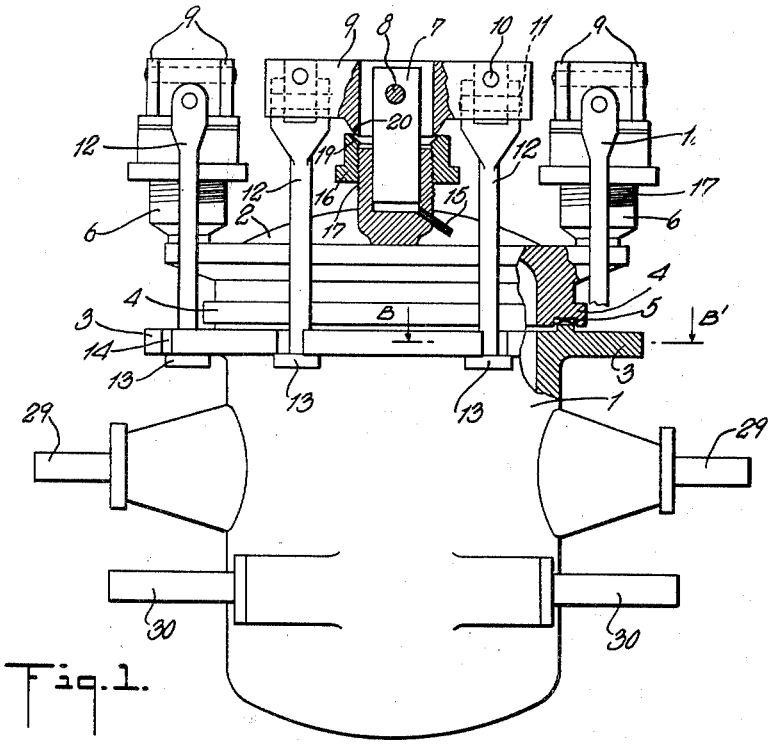
Figure 2:
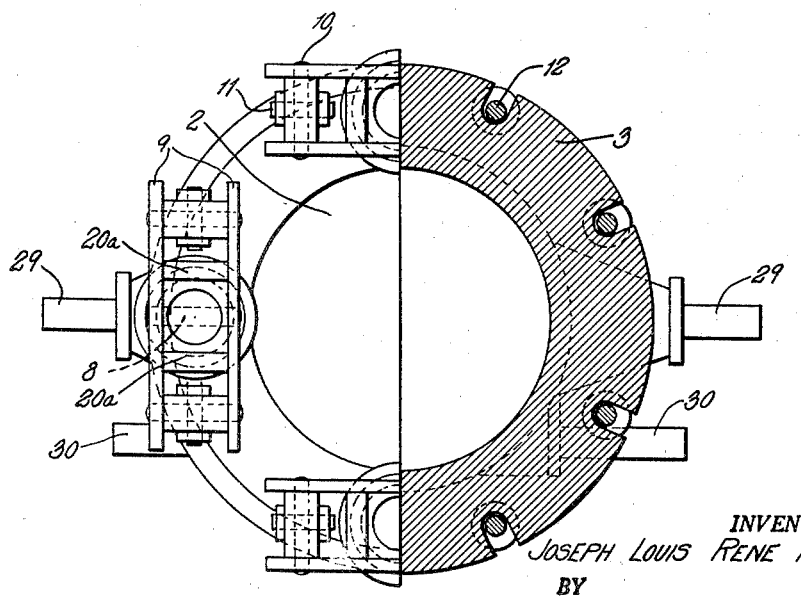
Fig. 2 is a view showing, on the left-hand side, a plan view of the cover and, on the right-hand side, a transverse section of the vat on the line B—B' of Fig. 1.

The autoclave shown comprises a vat 1 on which is adapted to be fitted a cover 2. The vat 1 and the cover 2 are formed with flanges 3 and 4, respectively, between which is interposed a sealing joint 5 which may be set in a groove as shown in Fig. 1.

In the example illustrated, hydraulic or pneumatic jack cylinders 6, having pistons 7, are fixed to the upper face of the cover 2. Each of the pistons 7 is articulated by a spindle 8 to a corresponding rocking lever, here constituted by two side plates 9—9. At each end of this rocking lever there is articulated, by means of a universal joint comprising spindles 10 and 11, a rod 12 which terminates at the end remote from the universal joint in an enlarged portion 13 adapted to engage under the flange 3 of the vat 1, notches 14 being formed in the said flange for accommodating the rods 12.

The fluid under pressure is admitted into the jacks through pipes 15 connected to a single source of fluid under pressure (not shown).

Figure 3:
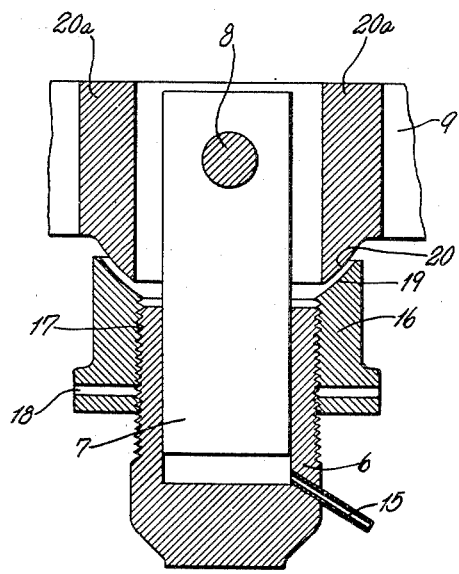
Fig. 3 is a detail view of a jack, in axial section.

The example shown comprises positive locking means on each jack constituted by a nut 16 screwed on a threaded portion 17 of the jack cylinder 6. The nut is actuated by means of tommybars introduced into openings 18 (Fig. 3). On the end adjacent to the rocking lever, the nut 16 exhibits a spherical bearing surface 19 which is adapted to fit against a boss 20 of complementary shape formed on the lower ends of crossbars 20a connecting the side plates 9—9 of the rocking lever. The spherical surface of this boss has its center on the axis of the spindle 8 midway between the two side plates 9—9 forming the rocking lever. The assembly 19—20 thus forms a kind of ball-and-socket joint insuring a uniform contact for the locking of the rocking levers, while permitting the latter to adapt themselves freely to the play of the articulated systems and to the relative positions of the vat and of the cover.

An autoclave provided with this mechanism for bringing the vat and cover together and for clamping the parts is utilized as follows:

The vat 1 containing the charge of products to be treated is brought to the vicinity of the cover 2 by any suitable means, and the different rods 12 are introduced into the corresponding notches 14 of the flange 3. The fluid under pressure is then progressively admitted into the jack cylinders 6 through the pipes 15. All the pistons 7 are thereby simultaneously displaced upwardly, carrying with them the rocking levers 9 and the rods 12. The latter, bearing by their enlarged portions 13 on the underside of flange 3, carry the vat 1 upwardly, thereby effecting the bringing together movement, and then this flange compresses the joint 5 against the flange 4 of the cover 2, such compression insuring the fluid-tightness of the closure.

The reaction which is to be carried out in the autoclave is then put under way, and during the course of this reaction, the pressure in the autoclave is generally increased progressively.

During the raising of the rocking levers 9 and the rods 12 under the action of the pistons 7, the spherical bosses 20 are progressively separated from the nuts 16. These clearances are taken up by screwing the nuts 16 along the screw threads 17 until their spherical bearing surfaces 19 engage the bosses 20. By this operation, the vat 1 and the cover 2 are locked together in their clamped position and the joint 5 is maintained at the degree of compression which resulted from the action of the jacks, so that a hermetic sealing obtains even should the pressure fluid supply to the jacks be cut off either fortuitously or willfully. Furthermore, the operator may carry out this supplementary locking operation however the reaction may be developing in the autoclave, so that there is no supplementary immobilization of the apparatus, such as occurs with the known sealing methods which make use solely of nut-and-bolt systems and in which the reaction can only be put under way after tightening these nuts. In addition, this supplementary locking operation is effected more rapidly than in the case of the known systems, since a subsequent check and an eventual second tightening of the nuts is not necessary.

In order to separate the vat from the cover after the reaction has been completed, the pressure in the autoclave is first caused to fall progressively and then the pressure fluid supply to the jacks is reestablished should this have been cut off. The nuts 16 are then screwed back on their threads 17 to separate them from the bosses 20 and the pressure in the jacks is released. The pistons slide down again under the weight of the articulated equipment which they support and the rods 12 may then be disengaged from the notches 14. It is then possible, if required, completely to separate the vat 1 of the autoclave from its cover 2 and to empty the contents.

As has been mentioned above, it is frequently preferred to have the cover in a fixed position in the works, this cover being, for example, supported from a frame prepared for this purpose, or even being suspended from the roof. Under these conditions, the vat must be capable of being displaced for charging, cleaning and emptying operations.

Figure 4:
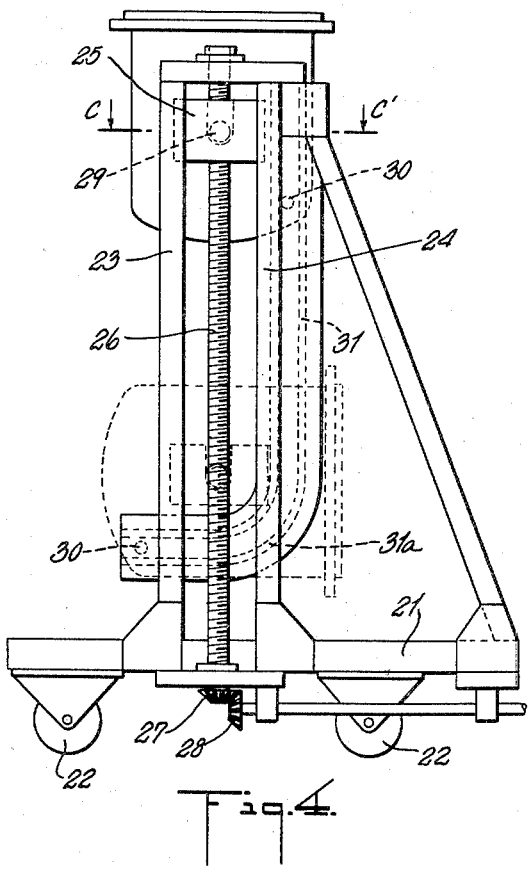
Fig. 4 is an elevation of a device permitting vertical movement of the vat and the tipping thereof.
Figure 5:
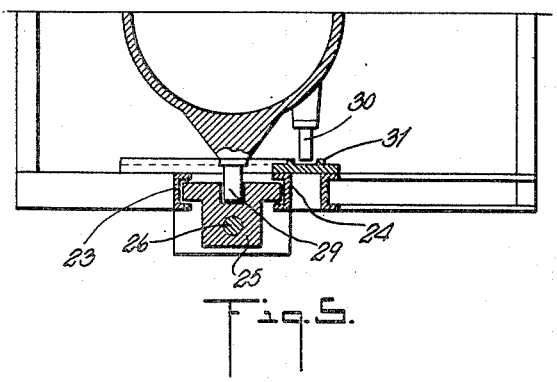
Fig. 5 is a horizontal section on the line C—C' of Fig. 4.

Figs. 4 and 5 illustrate a device associated with the autoclave which readily permits the vat to be lowered and brought to a position for loading, cleaning and unloading and then returned to its working position with respect to the cover.

This device comprises a carriage 21 running on rollers 22, either on the ground or on rails. This carriage supports two pairs of vertical slides 23 and 24 serving as guides for slide blocks 25 which constitute nuts on vertical threaded rods 26 which are fixed axially but are capable of being rotated around their respective axes, for example, by means of bevel gears 27—28. The vat 1 is provided with trunnions 29 by which it rests on the slide blocks 25 when it is free from the cover 2.

A mechanical or electric limit switch, suitably actuated, may be provided for limiting the raising or lowering movements of the slide blocks 25 along the threaded rods 26. Moreover, a travel reversing means for controlling the rotation of these threaded rods may be coupled to the device.

The vat 1 also carries two tilting rollers 30 which, during the displacement of the vat, are guided by two ramps 31 fixed to the slides 23, 24 on the carriage 21, these ramps being vertical over the greater part of their length but being curved inwardly at their lower ends 31a.

In order to maneuver the vat 1—for example, after completion of the reaction—for discharging purposes, the threaded rods 26 are set in rotation in a direction which corresponds to the lowering of the slide blocks 25. The vat also takes part in this lowering operation, which takes place vertically until the rollers 30, which travel in the ramps 31, reach the curved portions 31a of the latter. From this moment, the vat, still continuing its descent, tilts progressively about its trunnions under the guiding action of the ramps and comes to occupy the position represented in chain-dotted lines in Fig. 4, which permits the emptying to take place easily by bringing the carriage to the point of discharge.

For returning the vat to its working position, the same operations are carried out but in the reverse order, and the autoclave is then ready for a fresh operation.

An advantage of this invention is in an autoclave system for laboratories and plants in which a positive seal of the autoclave and cover is obtained by power means.

Another advantage of the invention is in the employment of a plurality of power means to seal the autoclave at a plurality of points, the sealing at the several points being balanced.

Another advantage of the invention is in means for handling an autoclave, during the several operations of loading, processing, unloading, and cleaning, to which it is subjected.

A further advantage is in the construction of a simple mechanical means for locking the parts of the autoclave in sealed relation so that failure of the power source will not operate to unbalance or to break the seal.

A particular advantage of the invention is in the speeding up of autoclave processes, which improves all systems economically so that products produced thereby may be sold at a more favorable rate.

Another particular advantage of the invention is in the balances which are useful not only with hydraulic jacks, but with any single means of applying pressure equally to two points.

As many apparently widely different embodiments of the present invention may be made without departing from the spirit and scope thereof, it is to be understood that the invention is not limited to the specific embodiments, except as defined in the appended claims.

What is claimed is:

1. An autoclave including a fixed cover and a movable vat having a notched flange, a plurality of fluid pressure jacks mounted on the cover, beams pivoted to said jacks and projecting over the notches in said flange, spherical bosses on said beams, nut screws threaded on said jacks having cooperating spherical cups, and rods pivoted on the beams having heads adapted to be received by the flange beneath the notches.

2. An autoclave including a fixed cover and a movable vat having a flange, a plurality of fluid pressure jacks mounted on the cover, beams pivoted to said jacks, bosses on said beams, nut screws threaded on said jacks having means to bear on said bosses, rods pivoted on the beams having means adapted to be attached to the flange, and inlets in said jacks to supply the jacks with fluid under pressure.

3. An autoclave having parts including a fixed cover and a movable vat, a plurality of fluid pressure jacks mounted on one of said parts, balances mounted on the jacks, connectors to join the balances to the other of said parts, and screw wedges to lock the jacks in sealing position.

4. An autoclave system including at least one movable autoclave vat and at least one fixed autoclave cover having cooperating parts of a sealing joint, means to transport a vat to the cover, means to seal the sealing joint including fluid pressure operable jacks mounted on the cover, beams pivoted on the jacks, rods attached to the beams having means for attachment to the vat, all said jacks being operable by fluid at a single pressure, and locking means to lock the jacks in sealing position.

5. An autoclave system including at least one movable autoclave vat and at least one fixed autoclave cover having cooperating parts of a sealing joint, means to transport a vat to the cover, means to seal the sealing joint including fluid pressure operable jacks mounted on one part of the autoclave, connections whereby each jack may be attached to the other part of the autoclave at a plurality of points, and equalizers to equalize the pressure exerted by the jacks on said points.

6. An autoclave plant system comprising movable autoclave vats and fixed autoclave covers, said autoclaves composed of a said vat and a said cover having equally spaced connectors whereby the covers and the vat are sealed together, and having jacks bearing upon connector pairs through balances, autoclave cars constructed and arranged to transport the vats to and from the covers and elevators on the cars constructed and arranged to move the vats into and from sealing relation therewith.

7. An autoclave system including at least one movable autoclave vat and at least one fixed autoclave cover having cooperating parts of a sealing joint, means to transport a vat to the cover, means to seal the sealing joint including fluid pressure operable jacks mounted on one part of the autoclave and supporting nuts movable into supporting position against the jacks, connections whereby each jack may be attached to the other part of the autoclave at a plurality of points, and equalizers constructed and arranged to equalize the pressure exerted by the jacks on said points.

8. An autoclave system including a vat and cover that are independently supported, the supporting means for the vat comprising a wheeled frame having vertically movable journals for the vat, means for moving the journals and vat from an upper position to a lower discharge position, and tilting means for discharging the vat comprising a guide track on the frame in curved relation to the vertical path of the vat, and a cooperating guide follower on the vat engaged with the track and an offset from the axis of said journals.

9. In a pressure vessel a vat, a cover, and a fluid pressure jack mounted on one of said parts of said vessel, a balance beam pivotally mounted on said jack, and connecting means attached to opposite arms of said balance beam and to the other of said parts of the container.

JOSEPH LOUIS RENE FATON.

REFERENCES CITED

The following references are of record in the file of this patent:

UNITED STATES PATENTS

| Number | Name | Date |
|---|---|---|
| 475,587 | Messick | May 24, 1892 |
| 1,359,875 | Da Costa | Nov. 23, 1920 |
| 1,469,070 | Jacobs | Sept. 25, 1923 |
| 1,874,833 | Taylor | Aug. 30, 1932 |
| 2,387,024 | Hishon et al. | Oct. 16, 1945 |